Dec. 18, 1962  J. W. HICKS, JR., ETAL  3,068,739
FLEXIBLE OPTICAL PROBE
Filed June 23, 1958  2 Sheets-Sheet 2
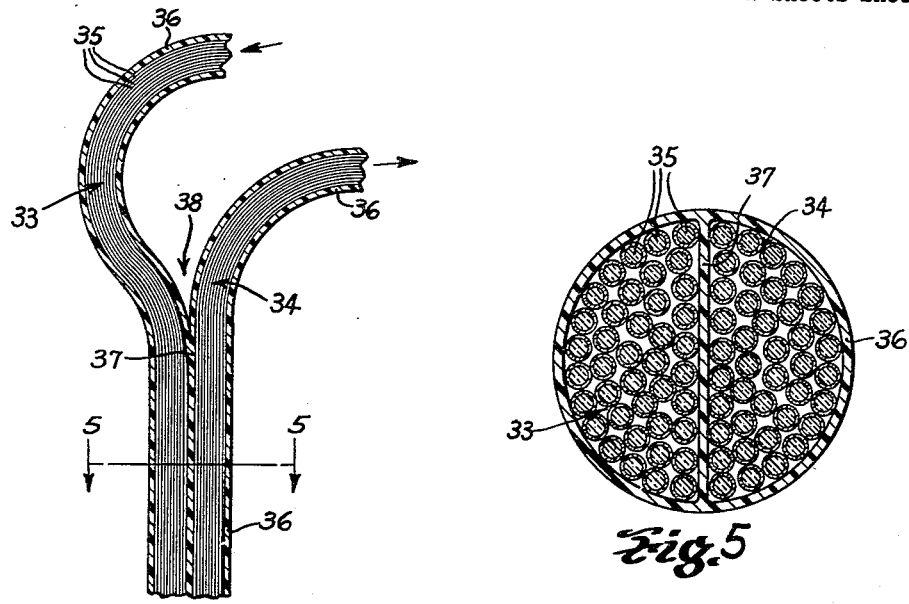
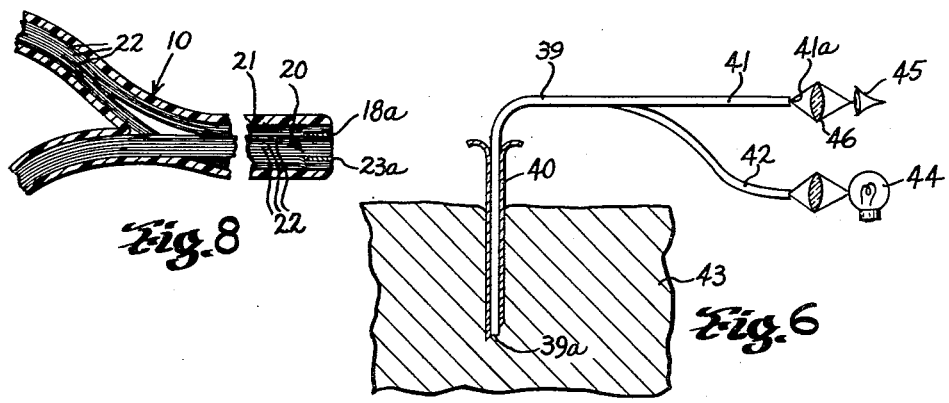
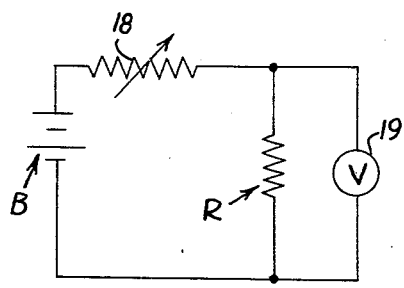
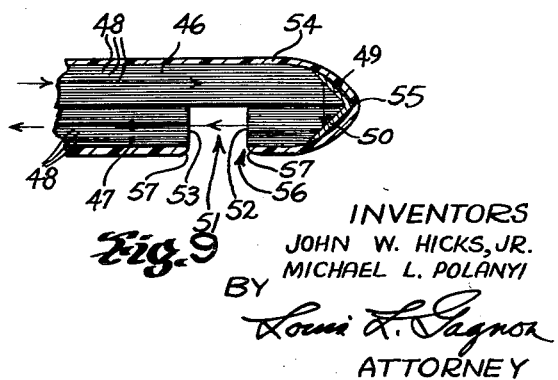
INVENTORS
JOHN W. HICKS, JR.
MICHAEL L. POLANYI
BY
Louis L. Gagnon
ATTORNEY

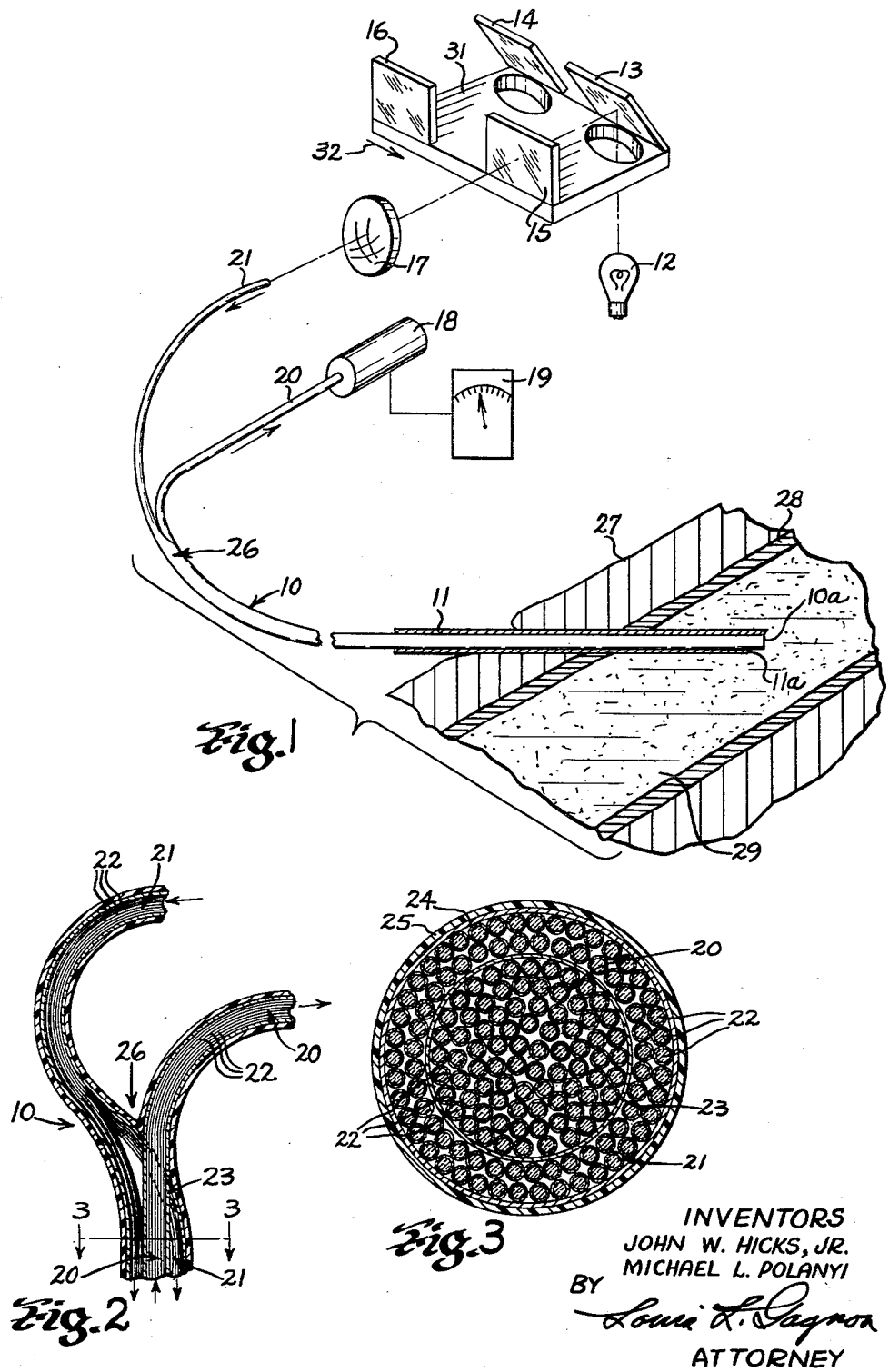

United States Patent Office 3,068,739
Patented Dec. 18, 1962

3,068,739
FLEXIBLE OPTICAL PROBE
John W. Hicks, Jr., Fiskdale, and Michael L. Polanyi, Webster, Mass., assignors to American Optical Company, Southbridge, Mass., a voluntary association of Massachusetts
Filed June 23, 1958, Ser. No. 743,631
3 Claims. (Cl. 88—1)

This invention relates to testing devices and has particular reference to improved means for examining specimens located normally at relatively inaccessible areas.

While the device of the invention is not limited in application to any one particular field, it will become apparent that the present invention offers a generous contribution to the biological field as an instrument for measuring continuously the oxygen saturation of blood, for example, in vertebrates.

Conventional sampling methods for measuring oxygen concentration of blood entail various known disadvantages such as the time periods required to obtain and analyze the individual samples during which periods, fluctuations in the oxygenation of the blood may occur which cannot be measured. Furthermore it is difficult to prevent changes in oxygen concentration due to outside air and other causes. Repeated sampling also causes possible pain and anxiety thus effecting the respiratory pattern of the patient and consequently the extent of oxygenation of the blood. Oximeters of the type adapted to continuously measure the oxygen saturation of the blood by projecting light through the ear of a person are known. While instruments of this type provide a continuous measurement of the oxygen saturation of the blood and obviate the necessity of puncturing the subject, they are less accurate in measurement than the sampling method when considering measurements taken at the intervals of sampling. This inaccuracy is, to a degree caused by the pigment of the ear not being clear but distributed in dense packets and the light-scattering and light-absorbing tissues of the ear structure. In order to minimize the inaccuracies which may result from such things as ear thicknesses, types of ear pigment, temperatures of the ear and various other factors involved in the technique of performing oximetry with the ear type of oximeter, various relatively complicated procedures must be followed such as estimating the "effective" thickness of the ear controlling the brightness of the illuminating means to give effective readings while providing means for preventing an overheating of the ear by the illuminating means and providing relatively intricate and complicated means for interpreting the output of the device in terms of oxygen saturation of the blood. Furthermore, devices of the above character can only be used to measure the oxygen saturation of arterial blood.

The device of the present invention, when used to perform oximetry, provides means for continuously measuring the oxygen saturation of either arterial or venous blood or the characteristics of other body fluids within a patient while overcoming the above difficulties.

In general the principal object of the present invention is to provide improved means for examining specimens colorimetrically.

Another object is to provide novel means for examining specimens located normally at relatively inaccessible areas.

Another object is to provide improved means for performing oximetry wherein, by photoelectric colorimetry, the oxygen saturation of arterial blood in man can be measured continuously.

Another object is to provide novel means for introducing light directly into the blood stream of vertebrates to cause said light to be scattered, absorbed and transmitted by said blood stream and means for returning a substantial portion of said light for purposes of continuously analytically determining from said returned light, certain characteristic changes in said blood.

Another object is to provide improved light-conducting fiber optical means adapted for easy insertion into relatively remote areas for examining specimens in said areas by directing light into said specimens and returning a substantial portion of said light for purposes of analysis.

A further object is to provide an improved highly flexible light-conducting probe of extremely small cross-sectional size and having at least two light-conducting paths insulated from each other, and in adjacent relation with each other throughout one section of the probe and separated from each other throughout a remaining section of the probe.

A still further object is to provide improved relatively simple, accurate and highly efficient means for performing oximetry in vivo with substantially no interference from body structures other than the components of the blood being examined.

Other objects and advantages of the invention will become apparent from the following description when taken in conjunction with the accompanying drawings in which:

FIG. 1 is a diagrammatic illustration of one form of device of the invention embodying light-conducting means;

FIG. 2 is a greatly enlarged longitudinal cross-sectional view of a portion of the light-conducting means of FIG.1;

FIG. 3 is an enlarged transverse cross-sectional view taken on line 3—3 of FIG. 2;

FIG. 4 is a greatly enlarged longitudinal cross-sectional view of a modified form of light-conducting means;

FIG. 5 is an enlarged transverse cross-sectional view of the means of FIG. 4 taken on line 5—5;

FIG. 6 is a diagrammatic illustration of an alternate form of the device of the invention;

FIG. 7 is a schematic diagram of the electrical measuring system of the device of FIG. 1;

FIG. 8 is a greatly enlarged fragmentary cross-sectional view of another modified form of light-conducting means; and FIG. 9 is a greatly enlarged fragmentary cross-sectional view of a further modified form of light-conducting means;

Referring more particularly to the drawings wherein like characters of reference designate like parts throughout the various views, there is diagrammatically illustraded in FIG. 1, a form of the invention wherein there is provided a flexible fiber optical light-transmitting probe 10 having one of its ends fixed internally of a hypodermic type needle 11. In association with the opposite end of the probe 10, which is bifurcated in a manner to be presently described, there is provided a colorimeter which embodies a light source 12, a pair of reflecting mirrors 13 and 14 and band pass filters 15 and 16 which are adjustable as a unit relative to said light source. Light focusing means 17 is located between the filters and an adjacent end of one of the bifurcations of the probe 10 and an electrical measuring circuit which includes photosensitive means 18 is located adjacent the end of the other of the bifurcations of the probe 10. A meter 19 is provided in the circuit for indicating the output of the photosensitive means 18.

The probe 10 embodies a pair of light-conducting channels 20 and 21 (FIGS. 1, 2 and 3) which may each consist of a single flexible light-conducting fiber but are preferably each formed of a great number of individually insulated light-conducting fibers 22 in tightly packed bundled relation with each other. The fibers 22 are initially constructed preferably by drawing a rod of light-conducting material which comprises a core part of flint glass or the like having a relatively high index of refraction having a thin light-insulating coating or cladding thereon of relatively low index material such, for example, as crown glass. While it is preferable to form the fibers 22 of glass it should be understood that other plastic materials may be used. The fibers may alternatively be formed by drawing a rod of plastic or any suitable high index light-conducting material into a fiber and thereafter coating the fiber with a low index light-insulating means such as, for example, a mixture of tetra-ethyl-ortho-silicate having microscopic particles of silica therein. Furthermore, if it is desired, the fibers 22 may be formed to each embody a plurality of light-conducting fibers or elements by multiple drawing methods. Reference may be made to applications bearing Serial Numbers 717,035, 703,914, 669,883 now Patent No. 2,992,516, and Patent No. 2,825,260 for more complete details with regard to the forming of the various types of light-conducting fibers.

The end of the probe 10, adjacent its connection with the hypodermic needle 11, is formed with its light-conducting channel 21 in surrounding relation with channel 20 (FIG. 3). That is, the channel 20 forms the core part of the probe 10 and in the form illustrated in FIG. 2, is insulated from its outer surrounding channel 21 by a relatively thin and flexible light shield 23 which may be formed of any suitable opaque material preferably a metal or plastic. A similar flexible light shield 24 is placed about the fibers 22 which make up the light-conducting channel 21 and a close fitting protective sheath 25 of plastic material or the like surrounds the above assembly as a means for preventing possible damage to the fibers 22 or shield 24 during the handling of the probe 10.

At a predetermined location along its length, the probe 10 is bifurcated to separate the light-conducting channels 20 and 21 from each other (see FIGS. 1 and 2). At this location, a junction 26 is formed wherein the fibers 22 of channel 21 are separated an amount sufficient to permit the channel 20, including its shield 23, to extend laterally through a side of the channel 21 and be separated from the composite structure of the part of the probe described above. At this junction 26, the fibers of the channel 21 are grouped tightly together as shown in FIG. 2 to continue on as a separate unit independent of and disconnected from the channel 20. It will be noted in FIG. 2 that at the junction 26 the light shield 24 which surrounds the channel 21 is opened only an amount sufficient to allow the light shield 23 of channel 20 to pass therethrough and the shield 24 at this opening is joined with the shield 23, which remains intact and continuous, to prevent light from straying outwardly of the probe. In this manner a complete light seal is provided at the junction 26 and the protective sheath 25 is tightly fitted about the junction so as to continue outwardly therefrom in surrounding fitted relation with each of the separated light-conducting channels 20 and 21.

The fibers 22 which make up the probe 10 are of a length equal to that desired of the probe and are continuous throughout their length.

The probe 10 of FIGS. 2 and 3 may alternatively be constructed without the light shields 23 and 24 as shown in FIG. 8. However, it is preferable in such a case to provide a relatively short tubular light shield 23a in surrounding relation with the innermost light conducting channel 20 to prevent light emitted from the light-conducting channel 21 from scattered laterally and being directly passed back into the channel 20. The individual fibers 22 being coated or clad as described above will provide individually insulated light paths throughout the remaining portion of the length of the probe so as to prevent any appreciable "cross-talk" or light interference between the channels 20 and 21.

Being relatively long and very small in cross-sectional area the fibers are inherently highly flexible and when assembled in grouped formation as shown in FIGS. 2, 3 and 8 the resulting structure (probe 10) becomes relatively flexible and free to bend. The opposite ends of the fibers 22 in each of the channels 20 and 21 are fused, glued or otherwise secured together to prevent longitudinal slippage or misalignment of the fibers and said opposite ends are optically finished to render the fibers receptive to the transmission of light. Flexible fiberscopes which are formed of a great number of elongated light-conducting fibers in bundled side-by-side relation with each other and secured together at their opposite ends may be made by various techniques such as disclosed in applications bearing Serial Numbers 703,914 and 719,540.

It is pointed out that the cross-sectional areas of the light-conducting channels 20 and 21 of the probe 10 may be controlled to be equal in size or of any other desired size relationship. That is, the channel 20 may be constructed to have a larger cross-sectional area than the channel 21 or vise versa.

The device of the invention, when in the form illustrated in FIG. 1, provides novel and improved means for performing oximetry wherein the oxygen saturation of the blood may be measured continuously while in circulation within the body of a patient.

In performing oximetry with the device of the invention, the hypodermic needle 11, having one optically finished end 10a of the probe 10 fixed therein (FIG. 1), is inserted through the tissues 27 of the body and into an artery 28 to place the leading end 11a of the needle 11 in the blood stream 29. In so doing, the end 10a of the probe 10 is placed in direct contact with the blood 29 as illustrated. Light is then projected from the above described colorimeter into one of the bifurcated ends of the probe 10 whereby it will be conducted through one of the light-conducting channels of the probe and emitted at the end 10a thereof into the blood stream 29. In the instance illustrated, the channel 21 is used to conduct the light into the blood stream. With both channels 20 and 21 being of substantially equal cross-sectional area, it is immaterial which of the two channels is used to transmit the light into the blood stream.

Upon being conducted into the blood stream, the light from the channel 21 will be scattered, absorbed and transmitted by the blood cells and other components of the blood. A substantial part of the light will then find its way back to the end 10a of the probe 10 and be conducted through the channel 20 thereof back to the colorimeter where it will be colorimetrically analyzed.

It is of clinical interest to determine the oxygen concentration of the blood in different portions of the organisms and by measuring the intensities of the light returning through the channel 20 of the probe 10 at selected spectral regions the percentage of oxygenated hemoglobin to the total amount of hemoglobin present in the blood may be determined. Hemoglobin, which is the respiratory pigment in the red corpuscles of vertebrates combines loosely with oxygen when passed through the lungs to become oxyhemoglobin and gives up the oxygen in the body tissues to become reduced hemoglobin.

It is known that by measuring the intensity of light which has passed through the blood stream within certain spectral regions, there are several cross-over wave lengths for oxyhemoglobin and reduced hemoglobin some of which can be substantially isolated by the use of proper band pass filters or combinations of filters which in effect produce substantially monochromatic light. At these cross-over points the light will be absorbed approximately equally by the oxyhemoglobin and the reduced hemoglobin so that by directing the light into the blood stream, where it will be partially absorbed and transmitted by the hemoglobin therein, and thereafter causing a substantial portion of the light transmitted by the hemoglobin to be returned to and fall upon suitable photosensitive means such as, for example, a cadmium selenide photoconductor 18 which is electrically connected with a meter 19, the voltage change in the electrical circuit including the photoconductor and meter is practically independent of the oxygen saturation of the hemoglobin but is highly sensitive to changes in total hemoglobin.

In order to perform this measurement, the branch of the colorimeter of FIG. 1 which directs light into the channel 21 of the probe 10 is provided with a light source 12, such as, for example, a 6 volt lamp, preferably of the tungsten filament type, which directs the light upwardly to a reflecting mirror 13. The mirror 13 then passes the light through a band pass filter 15, focusing optical element 17 and into the light-conducting channel 21 of the probe 10.

At a wave length of approximately 800 m$\mu$ which is one of the above mentioned cross-over points on the spectrum a determination of the total hemoglobin is obtained. In order to permit only a selected portion of the light from the source 12, which portion is within a very narrow band of the spectrum (approximately at 800 m$\mu$) to enter the channel 21 of the probe 10, the mirror 13 which reflects light forwardly to the filter 15 is rendered dichroic by any well known process but in the present instance is controlled so as to reflect only light within the approximate range of the spectrum between approximately 660 m$\mu$ and 875 m$\mu$ and to pass or transmit light within the remaining portions of the spectrum. The mirror 13 performs the dual function of narrowing the band of light which is directed to the filter 15 to within the approximate limits given above and by transmitting light which is outside said limits upwardly and away from the filter 15, the heat which is inherently produced by the portion of the light transmitted through the mirror 13 is prevented from reaching the filter 15, focusing means 17 and probe 10 and is thereby prevented from reaching the blood being analyzed.

In order to further narrow the band of light which is reflected by the mirror 13, the band pass filter 15 is constructed of a pair of conventional Wratten filters which are commercially available and which possess the desired filtering characteristics for obtaining a desired amount of reduction. It has been found that filters identified by No. 88A when placed in face-to-face relation with each other will block or cut off substantially all light within the regions of the spectrum below approximately 740 m$\mu$. Thus, it can be seen that the light which finally passes through the band pass filter 15 will be substantially only that of the light from the source 12 which is within the spectral range of from approximately 740 m$\mu$ to 875 m$\mu$ with an average of approximately 800 m$\mu$.

Upon entering the probe 10 and passing through its light-conducting channel 21 this light will enter the blood stream 29 as discussed previously, be scattered, partially absorbed and transmitted by the components of the blood and a substantial portion of said light will find its way back through the probe 10 to be received by the photosensitive means 18. The photosensitive means 18, which has been selected for purposes of illustration, is a cadmium selenide photoconductor. Photoconductors of this type are commercially available.

In FIG. 7 there is shown a schematic diagram of the electrical measuring system which includes the photosensitive means 18 (diagrammatically illustrated as a variable resistor), a source of current B such as a 135 volt battery connected in series with the photosensitive means 18, a 10 megohm load resistor R and the voltmeter 19 which is shunted across the load resistor R.

The portion of light which finds its way back from the blood stream through the probe 10 and excites the photosensitive means 18 causes a change in its resistance. The photosensitive means 18, being a cadmium selenide photoconductor, as stated above, is inherently high in resistance when dark (not receiving light) and when illuminated its resistance drops and it becomes more of a conductor. The change in resistance of the photosensitive means 18, in turn, causes a change in the current in the above described series circuitry which results in a change in the voltage across the load resistor R in accordance with the intensity of the light which excites the photosensitive means 18. This change in voltage is then measured by the voltmeter 19 which may be, for example, a commercially available "Senior Volt Ohmyst WV 97A."

The reading on the voltmeter 19 will then give an indication of the total hemoglobin since, as stated hereinabove, the response to the photosensitive means 18 in the instance just described is practically independent of the oxygen saturation of the hemoglobin in the blood but is highly sensitive to changes in total hemoglobin. Therefore, in order to provide a ratio between the total and reduced hemoglobin from which the percentage of the oxygenated hemoglobin to the total amount of hemoglobin present in the blood may be determined, it is necessary to take a second measurement of the light intensities at a wave length in the spectrum where the light is known to be absorbed unequally by oxyhemoglobin and reduced hemoglobin.

As an example, this second measurement is performed by using a band pass filter 16 and mirror 14 arrangement which will pass light having a wave length of approximately 620 m$\mu$ and reject substantially all other light. It should be understood that readings at other spectral regions may be taken for this second measurement and likewise, readings at other known crossover points for oxyhemoglobin and reduced hemoglobin may be used. The particular spectral locations which are cited herein are given by way of example only.

To make the above mentioned second measurement with the device of FIG. 1, the mirror 14 and band pass filter 16 are moved into optical alignment with the light source 12 and focusing means 17. This is accomplished by moving the platform 31, upon which said mirrors and filters are mounted as a unit, laterally in the direction of arrow 32.

The filter 16, in the example given above comprises the combination of an 8.8 mm. thick plate of heat absorbent glass and a Wratten No. 26 filter in face-to-face relation with each other. By providing the heat absorbent glass which, for example, may be a phosphate glass containing ferrous oxide of the type disclosed in A. G. Pincus, U.S. Patent No. 2,359,789 issued Oct. 10, 1944, the mirror 14 may be a conventional plane surface reflecting mirror (for instance silvered). Other combinations of filters 16 with dichroic mirrors 14 of known construction may be substituted for the examples given above to filter out the heat and light throughout the unwanted portions of the spectrum.

With the filter 16 and mirror 14 in place as described to filter the light from the source 12, light of an approximate wave length of 620 m$\mu$ will be directed through the channel 21 of the probe 10 and into the blood stream where it will be scattered partially absorbed and transmitted by the components of the blood. A substantial portion of said light will then find its way back to the end 10a of the probe and be directed through the channel 20 of the probe 10 to illuminate and excite the photosensitive means 18 whereupon the meter 19 will record the intensity of the light in the manner discussed previously.

The reading taken with the filter 15 and mirror 13 combination in place (which gives an indication of the total hemoglobin content of the blood) and the reading taken with the mirror 14 and filter 16 combination in place (which gives an indication of reduced hemoglobin) together with the use of well known calculating procedures common to oximetry will provide a measure of the percentage of oxygenated hemoglobin to the total hemoglobin in the blood (oxygenated plus reduced hemoglobin). By continually repeating the above described process of taking readings of the total and reduced hemoglobin of the blood a constant check on the oxygen saturation of the blood may be had. It is of course understood that under the conditions described above the possibility of contamination of the blood is practically eliminated.

It is pointed out that the light intensities will not be appreciably influenced by the other components of the blood (white cells, platelets, debris plasma) nor by the absorption of the fibers 22 of the probe. Furthermore, the possible changes which may be introduced by the characteristics of the individual blood to be measured such as size, shape and number of red cells, platelets white cells etc. can be taken into account by obtaining a calibration point on the individual blood when this blood is 100% oxygenated. Since the same light-conducting chanel (20) is used for both the total hemoglobin and reduced hemoglobin measurements, the measure is practically independent of transmission of the fibers 22.

With a device of the character described above, the oxygen saturation of the blood may be measured continuously as for example, during surgical anaesthesia wherein it is of great importance to maintain a continuous check on the oxygenation of the blood. By making a single insertion of the hypodermic needle 11 into the blood stream, the needle, carrying the probe 10, may remain in the blood stream for any desired extended period of time (i.e. during surgery or periods of examination) and with the end 10a of the probe 10 in direct contact with the blood, highly accurate measurements of the blood characteristics may be made since the body tissues themselves, the uneven distribution of pigment in the tissues or the different densities of these pigments will not appreciably interfere with the light passing through the blood stream and returned through the probe. In addiiton to providing a highly accurate analysis of the blood, the instrument is extremely simple to operate, may be made readily portable and easily adaptable to patients.

In instances where it is desired to examine the blood at remote locations well within the body of a patient such as, for example, in the heart, the end 10a of the probe 10, without the hypodermic needle 11 (see FIG. 8), is passed into an artery at a convenient location on the patient's body where the particular artery chosen is nearest the body surface. An appropriate opening into the artery is made for this purpose in a manner common to medical practices and the probe 10 is threaded into the artery until its end 10a reaches the desired location within the body where the blood is to be examined. During the threading of the probe 10 into the artery, its path of travel may be followed with the use of a fluoroscope or the like to determine the location of its end 10a at all times. Light transferred through one light-conducting channel of the probe will be emitted into the blood stream at the above mentioned remote location in the body and a substantial portion of said light will return through the other light-conducting channel of the probe to be analyzed in the manner described hereinabove.

It is pointed out that the probe 10 may be constructed to be of any desired length and cross-sectional size, its cross-sectional size being preferably considerably smaller in diameter than that of the veins or arteries into which it is inserted. It should be understood that for certain applications of use the fiber optical probe of the invention may be placed within one longitudinal section of a catheter such as used for extracting blood from the arteries or the heart.

A modified form of the fiber optical probe is shown in FIGS. 4 and 5 wherein a pair of light-conducting channels 33 and 34, each comprising a great number of light-conducting fibers 35, are placed in side-by-side relation with each other. A sheath of flexible opaque plastic or other suitable light-insulating material 36 is provided to encase the fibers 35 and insulate the light-conducting channels 33 and 34 from each other. The sheath 36 is formed with an internal web 37 throughout its length which separates the groups of fibers 35 of the respective light-conducting channels 33 and 34. At a predetermined location on the modified probe of FIGS. 4 and 5, a junction 38 is formed wherein the probe is bifurcated to separate the channels 33 and 34. At this junction, the sheath 36 is divided to encircle the separated channels 33 and 34 individually. The sheath 36 may be formed by extrusion processes so as to be continuous throughout its length and the fibers 35 may be thereafter threaded through the sheath or alternatively, the sheath may be formed directly on the groups of fibers 35 which make up the light-conducting channels 33 and 34 in much the same manner as insulation is applied to electrical conductors. Moreover, the light-conducting channels 33 and 34 may be constructed to differ in cross-sectional area by relocating the web part 37 of the sheath 36. It is also pointed out that when using light conducting fibers 35 which are each provided with light insulating claddings, the web 37 need not be extended throughout the entire length of the probe. However, a relatively short section of the web 37 should be provided to separate the light conducting channels 33 and 34 adjacent the end of the probe which is to be placed within a specimen. In so doing, light exiting from one of the channels will be prevented from scattering laterally and being directly passed back into the other of the channels.

FIG. 9 illustrates a further modified form of fiber optical probe which provides means for transmitting light through specimens (more particularly of the liquid type) rather than directing light into the specimens and receiving portions of said light which are reflected or otherwise directed back to the probe by the structure of the specimens as in the case of the above described probes of FIGS. 2, 4 and 8. The probe of FIG. 9 embodies a pair of light conducting channels 46 and 47 which may each be formed of one or more clad or light insulated fibers 48. For purposes of illustration, the channels 46 and 47 have been shown as each comprising a multiplicity of light-conducting fibers 48. The said channels 46 and 47 are placed in side-by-side relation with each other adjacent the end of the probe which is to be placed in contact with a specimen to be examined. The opposite end of the probe of FIG. 9 may be bifurcated to separate the channels 46 and 47 from each other in a manner similar to that shown in FIG. 4 and described above. At the end of the prob of FIG. 9 which is to be placed in contact with a specimen, the terminal ends of the channels 46 and 47 are optically finished with flat surfaces 49 and 50 respectively which are disposed at 45° to the longitudinal axes of their respective channels so as to provide an included angle of 90° therebetween. The surfaces 49 and 50 are silvered or otherwise treated to cause light passing through the channel 46 toward its surface 49 to be reflected in a direction normal to the axis of said channel and pass into the channel 47 whereupon it will be reflected by the mirror surface 50 back through the channel 47 in a direction parallel to its axis. The angle of reflection of the light from the surface 49, being greater than the critical angle of reflection of the cladding or insulating coating on the fibers 48, will cause said light to pass directly through said cladding. Alternatively, the ends of the channels 46 and 47 may be provided with a flat optically finished surface disposed normal to their longitudinal axes and a 90° prism would be placed in optical contact with the flat surface to replace the two mirrored surfaces 49 and 50.

In order to provide means for passing the above mentioned light through a specimen, a notch 51 is provided near the end of the probe which extends through the channel 47 and severs the fibers 48 thereof to form a pair of spaced parallel flat surfaces 52 and 53 which are disposed normal to the longitudinal axis of the channel 47. The surfaces 52 and 53 are optically finished to respectively transmit and receive light. When the end of the probe is placed within a liquid, for example blood, the liquid or blood will flow through or fill in the space between the surfaces 52 and 53 and light reflected from the mirror surface 50 will be transmitted directly through the liquid or blood and will be received at the surface 53 to continue on through the channel 47 of the probe to be colorimetrically or otherwise examined. A protective sheath 54 of plastic or other suitable flexible material is tightly fitted about the channels 46 and 47 of the probe so as to form a smooth rounded cap 55 over the end of the probe to permit its threading through a blood vessel or the like without causing possible damage to the blood vessel. An opening 56 through the sheath is provided at the location of the notch 51 to permit the specimen to flow into said notch and the edges 57 of the sheath at the opening 51 are preferably rounded inwardly to prevent the same from catching or injuring the blood vessel or the like when threaded therethrough. The sheath 54 is preferably cemented or otherwise securely attached to the fibers 48 of the light-conducting channels 46 and 47 to provide means for holding the separated parts of the channel 47 in properly aligned relation with each other and with the mirror surface 49 of the channel 46.

In FIG. 6 there is illustrated a modified form of the invention wherein a fiber optical probe 39 of the type shown in FIGS. 1, 2 and 3 or FIGS. 4 and 5 has one of its ends fixed internally of a tubular needle or the like 40 in substantially the same manner as the probe 10 is placed in needle 11. The probe 39 which embodies a pair of light-conducting channels 41 and 42 is bifurcated at its end opposite to the needle 40 to separate the channels 41 and 42 as illustrated. With the needle 40 inserted into a specimen 43 to be examined, light from a suitable source 44 is projected into the channel 42 of the probe and transmitted through said channel to the end 39a of the probe where it is emitted into the material of the specimen 43 to be scattered, partially absorbed and at least partially transmitted by the material of the specimen back to the end 39a of the probe 39 whereupon it is transferred through the channel 41 of the probe to an eye position 45. The light which is transmitted by the material of the specimen will take on the color of said material which may be observed directly at the end 41a of the channel 41. By providing an eye lens 46 adjacent the end 41a to establish an eye position 45, the end 41a of the probe 39 may be magnified and more conveniently viewed.

It is to be understood that the device of the invention may be used to examine remote areas of relatively solid specimens or liquids and the examination may be made optically as illustrated in FIG. 6 or instrumentally as shown in FIG. 1. The colorimeter of FIG. 1 could, of course, be replaced by any other known means for analyzing light.

From the foregoing, it can be seen that novel means have been provided for accomplishing all of the objects and advantages of the invention. Nevertheless, it is apparent that many changes in the details of construction, and arrangement of parts may be made without departing from the spirit of the invention as expressed in the accompanying claims and the invention is not limited to the exact matters shown and described as only the preferred matters have been given by way of illustration.

Having described our invention, we claim:

1. A flexible optical probe comprising a plurality of relatively long, thin and flexible optical fibers having a portion adjacent a first end thereof wherein all of said fibers are intimately grouped in side-by-side relation with each other, said fibers each embodying a core part of light-conducting material of a relatively high index of refraction surrounded by a relatively thin cladding material of relatively low index of refraction and being tightly encased and secured against longitudinal slippage and misalignment internally of a hypodermic type needle having a part whose outer diameter is smaller than the diameter of a normal artery of a vertebrate and which may be inserted through the body tissue and wall of the artery and into the blood in said artery, certain of said fibers adjacent the outer end of said hypodermic type needle having a surface thereon which is exposed to engage the blood, said certain of said fibers at the opposite end portion of said probe being separated from the remainder of said fibers, said certain of said fibers and said remainder of said fibers being respectively grouped in relatively intimate side-by-side relation with each other whereby the group of said certain fibers may be arranged to receive light at said opposite end and convey the same longitudinally of said fibers through the surface adjacent the outer end of the needle and into the blood in said artery whereby said light may become characterized thereby and be thereafter transmitted back through said remainder of said fibers.

2. A flexible optical probe comprising a plurality of relatively long, thin and flexible optical fibers having a portion adjacent a first end thereof wherein all of said fibers are intimately grouped in side-by-side relation with each other, said fibers each embodying a core part of light-conducting material of a relatively high index of refraction surrounded by a relatively thin cladding material of relatively low index of refraction, said fibers being tightly encased and secured against longitudinal slippage and misalignment relative to each other internally of a hollow tubular portion having a continuous uninterrupted outer smooth surface, said tubular portion being of an outer diameter which is smaller than the diameter of a blood vessel of a vertebrate into which said tubular portion is to be inserted and being adapted to be inserted through the body tissue and wall of the blood vessel and into the blood in said blood vessel, certain of said fibers adjacent the outer end of said tubular portion having a surface thereon which is exposed for effective optical contact with the blood when said tubular portion has been inserted into said blood vessel, said certain of said fibers of said probe being separated from the remainder of said fibers at least at their opposite end, said certain of said fibers and said remainder of said fibers being respectively grouped in relatively intimate side-by-side relation with each other at said opposite end, whereby the group of said certain fibers may be arranged to receive light at said opposite end and convey the same longitudinally of said fibers through the surface adjacent the outer end of said tubular portion and into the blood in said blood vessel whereby said light may become characterized thereby and be thereafter transmitted back through said remainder of said fibers.

3. A light-transmitting member for use with a device as set forth in claim 2 comprising a rigid needle-like member having a long and slender hollow portion of a diameter smaller than the diameter of a blood vessel of a vertebrate in which the hollow portion is to be inserted through the body tissue and wall of said vessel, said long and slender hollow portion having a continuous uninterrupted smooth outer surface, a plurality of light-conducting fibers each embodying a core part of light-conducting material of a relatively high index of refraction surrounded by a relatively thin cladding material of relatively low index of refraction having portions thereof secured in compact side-by-side relation with each other in said hollow portion and extending longitudinally throughout the major portion of the length of said hollow portion, said fibers being fixed against longitudinal slippage in said hollow portion and having finished end surfaces adjacent the tip of said hollow portion adapted to make effective optical contact with the blood in said vessel when said needle-like member is inserted therein and certain of said fibers adjacent said tip being arranged to function cooperatively as a group independently of others of said fibers for transmitting light through said certain of said fibers into said blood whereby said light may become characterized by said blood and be thereafter transmitted back through said other of said fibers.

References Cited in the file of this patent

UNITED STATES PATENTS

| | | |
|---|---|---|
| 2,324,304 | Katzman | July 13, 1943 |
| 2,420,716 | Morton et al. | May 20, 1947 |
| 2,678,431 | Lewis | May 11, 1954 |
| 2,699,770 | Fourestier et al. | Jan. 18, 1955 |
| 2,825,260 | O'Brien | Mar. 4, 1958 |

FOREIGN PATENTS

| | | |
|---|---|---|
| 179,905 | Austria | Oct. 25, 1954 |